US012741765B2

(12) United States Patent
Otaki et al.

(10) Patent No.: US 12,741,765 B2
(45) Date of Patent: Sep. 22, 2026

(54) METHOD FOR FIXING FLIGHT VEHICLE DURING TRANSPORTATION AND MOBILITY-AS-A-SERVICE (MAAS) PROVIDING METHOD

(71) Applicant: TOYOTA JIDOSHA KABUSHIKI KAISHA, Toyota (JP)

(72) Inventors: Yoshifumi Otaki, Nisshin (JP); Hirofumi Taniguchi, Yokohama (JP); Hiroto Tsukamoto, Wako (JP); Toshimitsu Saijo, Nisshin (JP); Daisaku Higashi, Nagoya (JP); Naoya Oka, Nagoya (JP); Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/021,377

(22) Filed: Jan. 15, 2025

(65) Prior Publication Data

US 2025/0242952 A1 Jul. 31, 2025

(30) Foreign Application Priority Data

Jan. 25, 2024 (JP) ................................ 2024-009730

(51) Int. Cl.

*B64U 80/84* (2023.01)
*B64U 10/20* (2023.01)
*B64U 80/40* (2023.01)
*B64U 101/61* (2023.01)

(52) U.S. Cl.

CPC ............ *B64U 80/84* (2023.01); *B64U 10/20* (2023.01); *B64U 80/40* (2023.01); *B64U 2101/61* (2023.01); *B64U 2201/10* (2023.01)

(58) Field of Classification Search

CPC ........ B64U 80/40; B64U 80/80; B64U 80/82; B64U 80/84; B64U 80/86; B64F 1/125; B60P 3/11; B63G 11/01

See application file for complete search history.

(56) References Cited

U.S. PATENT DOCUMENTS

2006/0278757 A1* 12/2006 Kelleher .................. B64D 5/00 244/63
2014/0183300 A1* 7/2014 MacCulloch .......... B64U 50/19 244/1 TD
2014/0379173 A1* 12/2014 Knapp .................. G06Q 50/18 701/2

FOREIGN PATENT DOCUMENTS

WO 2017/203590 A1 11/2017

* cited by examiner

*Primary Examiner* — Nicholas McFall
(74) *Attorney, Agent, or Firm* — SoraIP, Inc.

(57) ABSTRACT

The present disclosure relates to a method for fixing a flight vehicle during transportation and a MaaS providing method. A method for fixing a battery-driven flight vehicle during transportation that includes fixing the flight vehicle by connecting a predetermined portion of the flight vehicle and a moving body by a wire.

1 Claim, 5 Drawing Sheets

METHOD FOR FIXING FLIGHT VEHICLE DURING TRANSPORTATION AND MOBILITY-AS-A-SERVICE (MAAS) PROVIDING METHOD

CROSS-REFERENCE TO RELATED APPLICATION

This application claims priority to Japanese Patent Application No. 2024-009730 filed on Jan. 25, 2024, incorporated herein by reference in its entirety.

BACKGROUND

1. Technical Field

The present disclosure relates to a method for fixing a flight vehicle during transportation and a MaaS providing method.

2. Description of Related Art

Hitherto, there is disclosed a technology in which a flight vehicle includes a power reception device that receives electric power by magnetic resonance contactless power feeding, and a propulsion generation mechanism that obtains propulsion for flight with the electric power received by the power reception device (e.g., WO 2017/203590).

SUMMARY

Hitherto, research has not been conducted into a method for fixing a battery-driven flight vehicle during its marine or land transportation. That is, there is room for improvement in marine and land transportation technologies for battery-driven flight vehicles.

In view of such circumstances, an object of the present disclosure is to improve marine and land transportation technologies for battery-driven flight vehicles.

A method for fixing a battery-driven flight vehicle during transportation according to an embodiment of the present disclosure is a method for fixing a battery-driven flight vehicle during transportation, the method including fixing the flight vehicle by connecting a predetermined portion of the flight vehicle and a moving body by a wire.

According to the embodiment of the present disclosure, the marine and land transportation technologies for battery-driven flight vehicles are improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating an outline of a method for fixing a flight vehicle according to an embodiment of the present disclosure;

FIG. 2 is a diagram illustrating a flight vehicle fixed by a method for fixing according to an embodiment of the present disclosure;

DETAILED DESCRIPTION OF EMBODIMENTS

Figure 3:
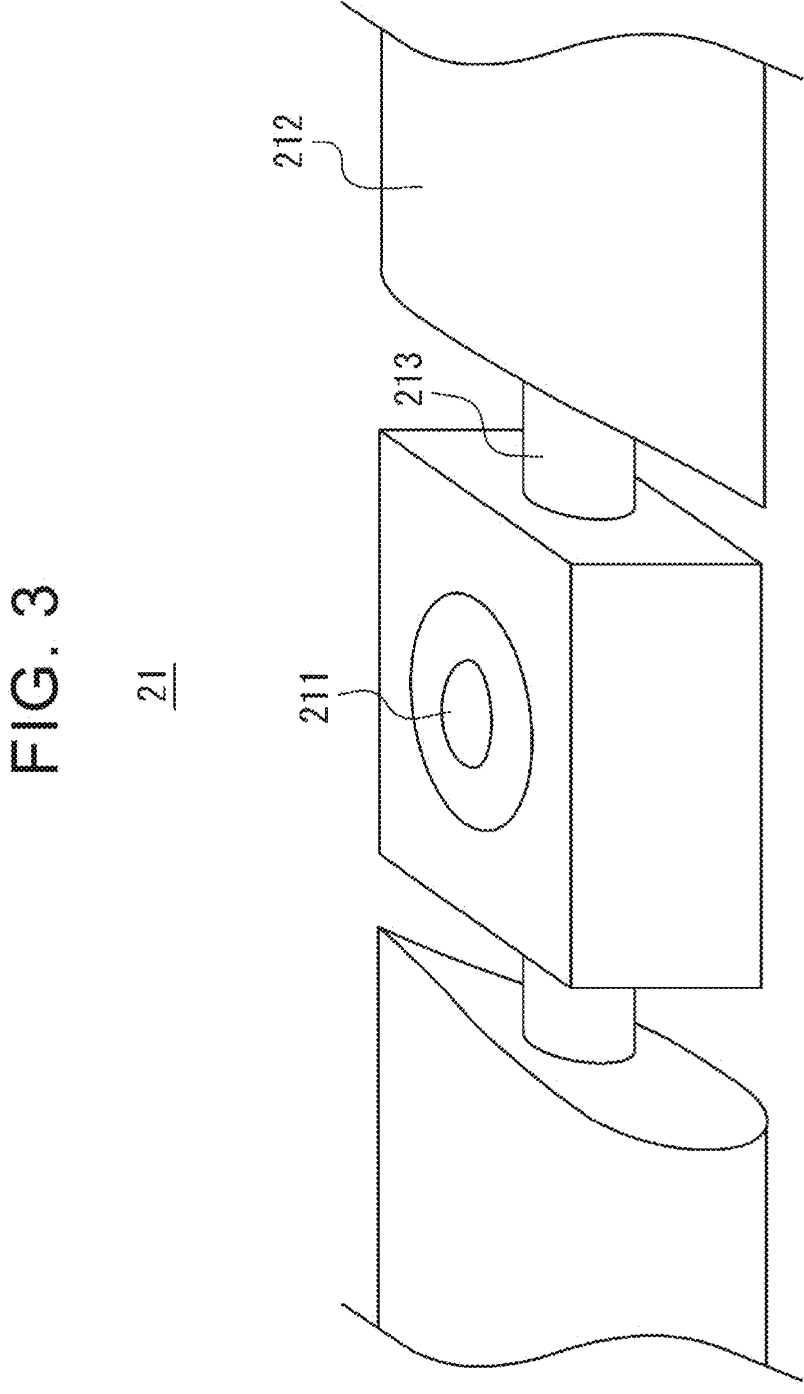
FIG. 3 is a schematic diagram of a lift generating portion of a flight vehicle according to an embodiment of the present disclosure.

Hereinafter, an embodiment of the present disclosure will be described.

Outline of Embodiment

Figure 1:
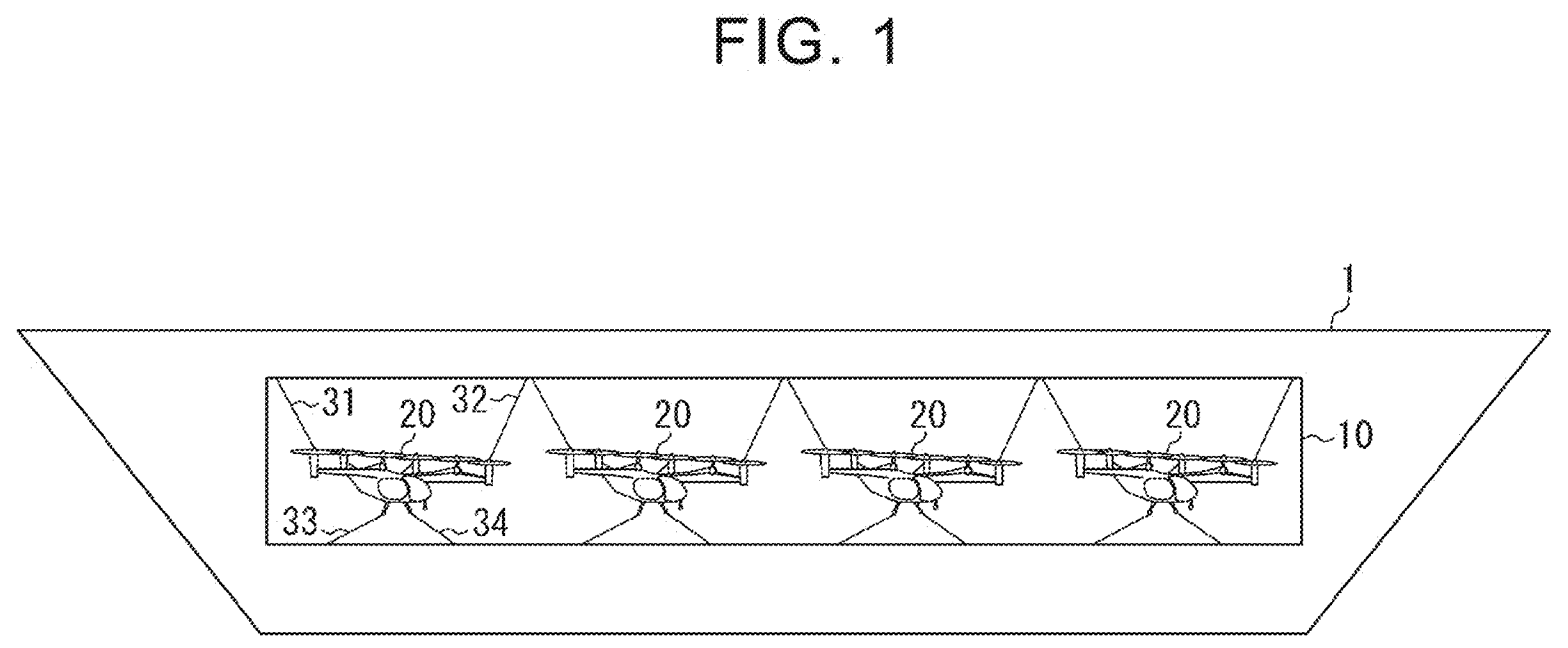

With reference to FIG. 1, an outline of a method for fixing according to an embodiment of the present disclosure will be described. A method for fixing according to an embodiment of the present disclosure is a method of fixing a battery-driven flight vehicle 20 by a moving body 1 such as a ship or a vehicle at the time of sea or land transportation. FIG. 1 shows an example of a method for fixing during marine transportation, and shows an example in which the moving body 1 is a ship. The moving body 1 has a storage area 10 for storing the flight vehicle 20. As shown in FIG. 1, a plurality of flight vehicles 20 are stored in a storage area 10 of the moving body 1. Although four flight vehicles 20 are stored in the storage area 10 in FIG. 1, the number of the flight vehicles 20 to be stored is not limited to this, and may be less than four, or may be five or more.

The flight vehicle 20 is driven by a battery. The flight vehicle 20 includes a passenger plane, an airplane, a helicopter, a drone, and the like. For example, the flight vehicle 20 includes a cabin of substantially the same size as a passenger vehicle on which one or more passengers can ride, and a mechanism including one or more electric rotors for generating lift and thrust. The flight vehicle 20 is, for example, an eVTOL (electric Vertical Take Off and Landing), which is at least partially steered by a VFR (Visual Flight Rules). The flight vehicle 20 includes a drive mechanism including a motor for driving the electric rotor, a control device thereof, and a battery for supplying electric power to the drive mechanism. The battery is, for example, a lithium-ion battery. The flight vehicle 20 may be maneuvered by an instrument flight scheme (IFR: Instrument Flight Rules). The flight vehicle 20 has a communication function and an information processing function, and is connected to a network via a mobile communication network.

First, the outline of the present embodiment will be described, and the details will be described later. In the method for fixing according to the embodiment of the present disclosure, as shown in FIG. 1, a predetermined portion of the flight vehicle 20 and the moving body 1 are connected and fixed by a wire 31, a wire 32, a wire 33, and a wire 34. In FIG. 1, the flight vehicles 20 are fixed by four wires, but the present disclosure is not limited thereto. The number of wires for fixing each flight vehicle 20 may be less than four, or may be five or more.

As described above, according to the present embodiment, the moving body 1 and a predetermined portion of the flight vehicle 20 are connected and fixed by wires. Therefore, the flight vehicle 20 is appropriately positioned in the storage area 10 of the moving body 1. As a result, the flight vehicle 20 can be protected from vibration and impact caused by vibration, acceleration, and deceleration during transportation, and as a result, damage, deformation, damage, and the like of the flight vehicle 20 can be suppressed.

In this way, the marine transport and land transport technology related to the battery-driven flight vehicle is improved.

Next, a method for fixing according to an embodiment of the present disclosure will be described in detail.

Figure 2:
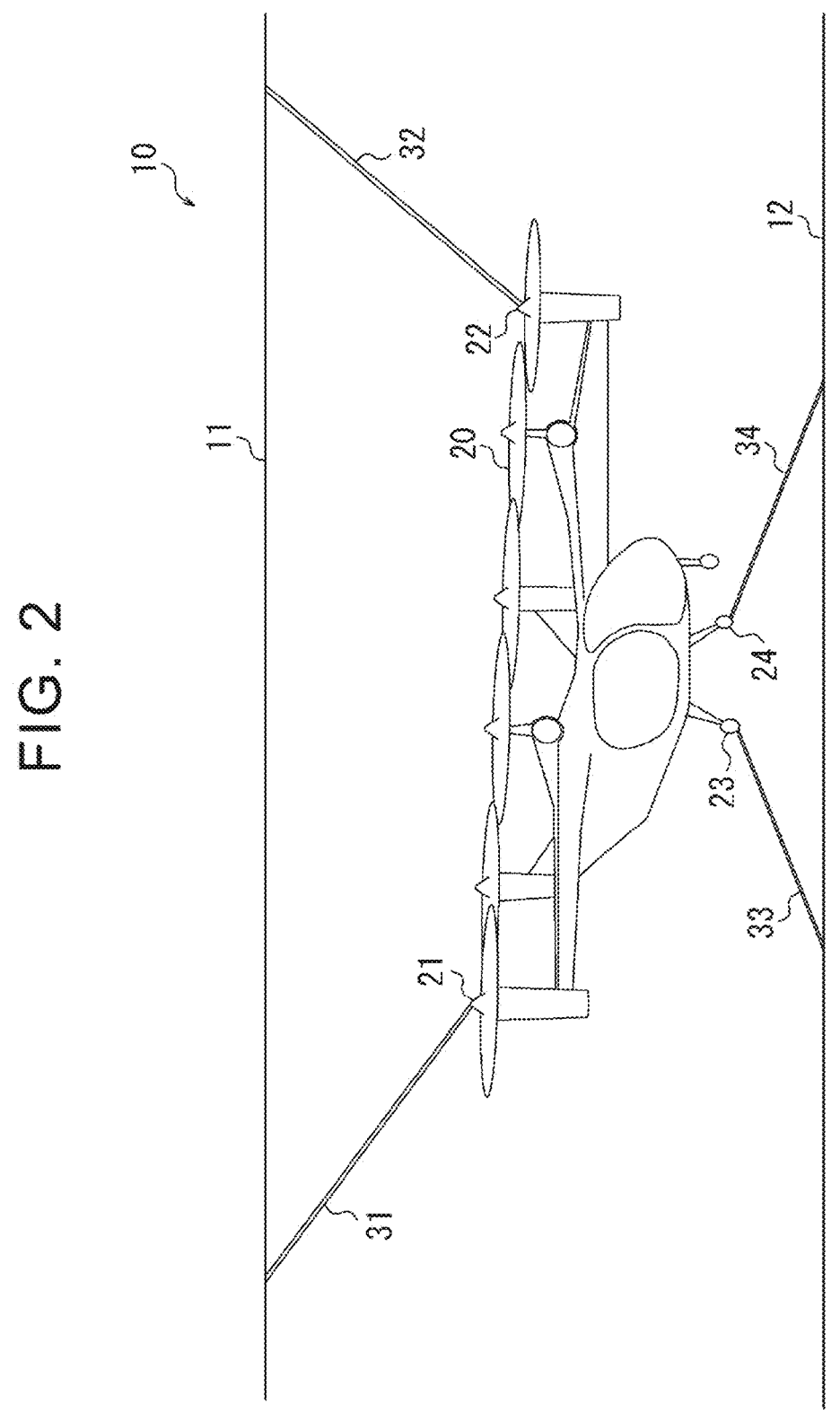

FIG. 2 is a diagram illustrating a flight vehicle 20 fixed by a method for fixing according to an embodiment of the present disclosure. As shown in FIG. 2, a predetermined portion of the flight vehicle 20 fixed by the wire 31, the wire 32, the wire 33, and the wire 34 may be, for example, the lift generating portion 21 and the lift generating portion 22 of the flight vehicle 20. Such predetermined portions may be the axle 23 and the axle 24 of the flight vehicle 20. The lift generating portion 21 and the lift generating portion 21, and the axle 23 and the axle 24 are driving portions of the flight vehicle 20 and have high durability. Thus suitable for fixing the wire 31, wire 32, wire 33, and the wire 34. The other ends of the wire 31 and the wire 32 are connected to the ceiling 11 of the storage area 10 of the moving body 1. The other ends of the wire 33 and the wire 34 are connected to the floor 12 of the storage area 10 of the moving body 1. In the examples shown in FIGS. 1 and 2, the flight vehicle 20 is suspended in the storage area 10. As a result, vibration or impact from the floor 12 is suppressed from being transmitted to the flight vehicle 20. Incidentally, the flight vehicle 20 may not be suspended in the air. For example, the flight vehicle 20 may be grounded to the floor 12.

FIG. 3 is a schematic diagram of the lift generating portion 21 of the flight vehicle 20 according to an embodiment of the present disclosure. The lift generating portion 21 of the flight vehicle 20 according to the present embodiment includes a propeller rotation shaft 211, a propeller 212, and a propeller connecting portion 213. For example, the wire 31 may be connected to the propeller rotation shaft 211. A fairing fitting portion such as a sled is provided at an upper portion of the propeller rotation shaft 211. The propeller rotation shaft 211 may be connected to the wire 31 by using a fairing fitting portion. Specifically, for example, the fairing of the propeller rotation shaft 211 is removed during transportation, and the wire connecting member is attached to the fairing fitting portion. The wire connecting member is connected to an end portion of the wire 31 on the flight vehicle side. The wire connecting member has a fitting portion such as a thread corresponding to the fairing fitting portion. As described above, the propeller rotation shaft 211 of the lift generating portion 21 can be used as the predetermined portion to which the wire is connected. Since the lift generating portion 22 has the same structure, a description thereof will be omitted.

Figure 4:
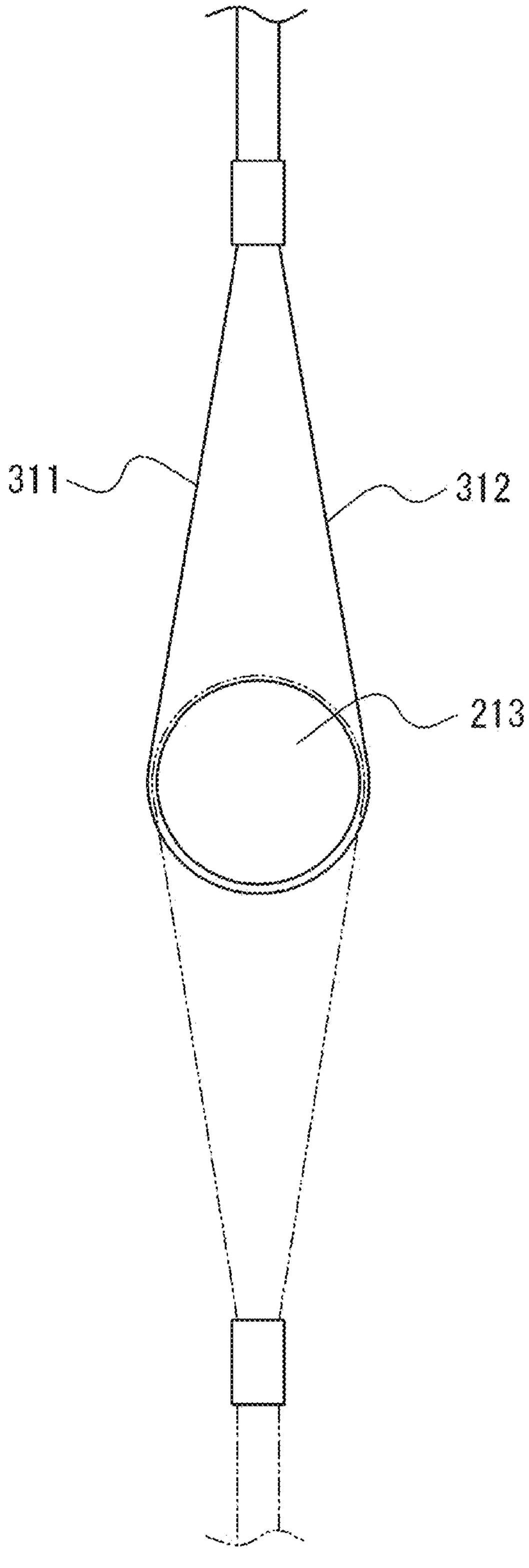
FIG. 4 is a schematic diagram showing a method for fixing a propeller connecting portion.

The predetermined portion fixed by the wire may be another position of the lift generating portion 21. For example, the predetermined portion may be the propeller connecting portion 213. In a case where the predetermined portion is the propeller connecting portion 213, it may be fixed by being sandwiched from both side surfaces of the propeller connecting portion 213 by a plurality of wires. FIG. 4 is a schematic diagram illustrating an example of a method for fixing the propeller connecting portion 213. As shown in FIG. 4, the propeller connecting portion 213 may be fixed by being sandwiched by the wire 311 and the wire 312.

Figure 5:
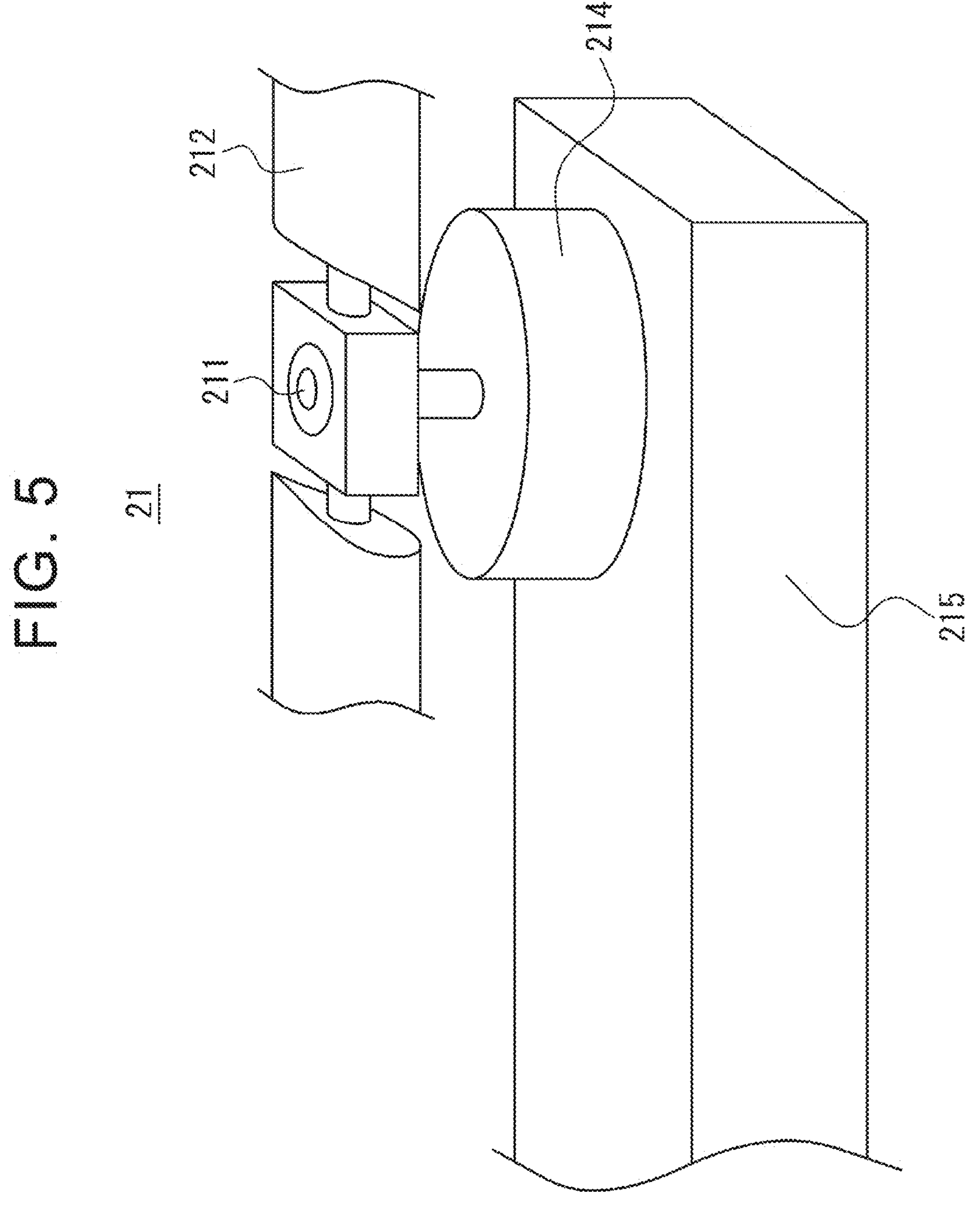
FIG. 5 is a schematic diagram illustrating a motor housing portion and a structural member of a lift generating portion of a flight vehicle according to an embodiment of the present disclosure.

The predetermined portion of the flight vehicle 20 fixed by the wire may be another portion of the lift generating portion 21. FIG. 5 is a schematic diagram illustrating the motor housing portion 214 and the structural member 215 of the lift generating portion 21 of the flight vehicle according to an embodiment of the present disclosure. As shown in FIG. 5, a lower end portion of the propeller rotation shaft 211 of the lift generating portion 21 is connected to the motor housing portion 214. An electric rotor for generating a lift force and a thrust force is provided inside the motor housing portion 214. The motor housing portion 214 is provided on a structural member 215 that is connected to the fuselage of the flight vehicle 20. For example, a predetermined portion of the flight vehicle 20 fixed by a wire may be the motor housing portion 214. In addition, the predetermined portion of the flight vehicle 20 fixed by the wire may be a structural member 215 that connects the lift generating portion 21 and the fuselage.

As described above, according to the present embodiment, a predetermined portion of the flight vehicle 20 is connected to and fixed to the moving body 1 by wires. Therefore, the flight vehicle 20 is appropriately positioned in the storage area of the moving body 1. As a result, the flight vehicle 20 can be protected from vibration and impact caused by vibration, acceleration, and deceleration during transportation, and as a result, damage, deformation, damage, and the like of the flight vehicle 20 can be suppressed. In this way, the marine transport and land transport technology related to the battery-driven flight vehicle is improved.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, the predetermined portion of the flight vehicle 20 fixed by the wire may be a ground-based installation or a jack-up point. In a case where the lift generating portion of the flight vehicle 20 has a tilt axis, a predetermined portion of the flight vehicle 20 fixed by a wire may be a tilt axis.

In one embodiment, the flight vehicle 20 may be used to provide MaaS (mobility as a service), which is a mobility-based service.

What is claimed is:

1. A method for fixing a battery-driven flight vehicle during transportation, the method comprising fixing the flight vehicle by connecting a predetermined portion of the flight vehicle and a moving body by a wire, wherein the predetermined portion is a motor housing portion of a lift generating portion of the flight vehicle.

* * * * *